(12) United States Patent
Gurevich

(10) Patent No.: US 8,146,158 B2
(45) Date of Patent: Mar. 27, 2012

(54) EXTENSIBLE ACTIVATION EXPLOIT SCANNER

(75) Inventor: Peter Alexi Gurevich, Woodinville, WA (US)

(73) Assignee: Microsoft Corporation, Remond, WA (US)

(*) Notice: Subject to any disclaimer, the term of this patent is extended or adjusted under 35 U.S.C. 154(b) by 581 days.

(21) Appl. No.: 12/346,391

(22) Filed: Dec. 30, 2008

(65) Prior Publication Data

US 2010/0169976 A1 Jul. 1, 2010

(51) Int. Cl.
*G06F 11/00* (2006.01)
(52) U.S. Cl. .......................................................... 726/22
(58) Field of Classification Search .................. 726/22; 717/168
See application file for complete search history.

(56) References Cited

U.S. PATENT DOCUMENTS

| | | | |
|---|---|---|---|
| 6,301,668 B1 | 10/2001 | Gleichauf et al. | |
| 6,480,144 B1* | 11/2002 | Miller et al. | 342/72 |
| 6,624,752 B2* | 9/2003 | Klitsgaard et al. | 340/572.1 |
| 7,069,595 B2 | 6/2006 | Cognigni et al. | |
| 7,380,123 B1 | 5/2008 | Hernacki et al. | |
| 2002/0136225 A1* | 9/2002 | Joy et al. | 370/401 |
| 2003/0014755 A1* | 1/2003 | Williams | 725/62 |
| 2003/0098883 A1* | 5/2003 | Pennell et al. | 345/781 |
| 2004/0153649 A1* | 8/2004 | Rhoads et al. | 713/176 |
| 2005/0182924 A1* | 8/2005 | Sauve et al. | 713/154 |
| 2005/0198110 A1 | 9/2005 | Garms et al. | |
| 2005/0229250 A1 | 10/2005 | Ring et al. | |
| 2006/0053492 A1 | 3/2006 | Wallace | |
| 2007/0266434 A1 | 11/2007 | Reifer | |

FOREIGN PATENT DOCUMENTS

WO 2007147495 A2 12/2007

OTHER PUBLICATIONS

"Microsoft Releases (Early) Its KB940510 Update: An Anti-Grace Timer and Anti-OEM BIOS Vista Activation Crack Detector", retrieved at /suprbay.org/showthread.php?t=14316>> Feb. 27, 2008, pp. 23.*
"Microsoft Releases (Early) Its KB940510 Update: An Anti-Grace Timer and Anti-OEM BIOS Vista Activation Crack Detector", retrieved at <<http://suprbay.org/showthread.php?t=14316>> Feb. 27, 2008, pp. 23.

(Continued)

*Primary Examiner* — Kambiz Zand
*Assistant Examiner* — Abiy Getachew
(74) *Attorney, Agent, or Firm* — Capitol City TechLaw; Richard C. Irving

(57) ABSTRACT

An extensible activation exploit scanner may have a modular structure, such that capabilities of the activation exploit scanner may be updated easily. The extensible activation exploit scanner may include an exploit data file, at least one detection module, at least one response module, and a base scanner. The exploit data file may have a number of entries, each of which may include information about a respective activation exploit or a respective class of activation exploit, as well as information about a detection module and a response module. The activation exploit scanner may read an entry of the exploit data file, may execute a detection module, corresponding to the entry, to detect a respective activation exploit or class of activation exploit, and may execute a response module, corresponding to the entry, to perform an action when the respective activation exploit or the class of activation exploit is detected.

20 Claims, 4 Drawing Sheets

100

OTHER PUBLICATIONS

Keizer, Gregg, "Vista Starts Spotting Activation Cracks", retrieved at <<http://www.computerworld.com/action/article.do?command=viewArticleBasic&articleId=9065199>> Feb. 27, 2008, pp. 4.

Wong, Adrian, "ED#84 : Microsoft Silently Rolls out Anti-Hack Update for Windows Vista", retrieved at <<http://www.techarp.com/showarticle.aspx?artno=516&pgno=0>> May 8, 2008, pp. 3.

Vigna, et al., "Testing Network-based Intrusion Detection Signatures using Mutant Exploits", retrieved at <<http://www.cs.ucsb.edu/~wkr/publications/ccs04sploit.pdf>> Oct. 25-29, 2003, ACM, pp. 10.

"International Search Report", Mailed Date: Jul. 18, 2010, Application No. PCT/US2009/065098, Filed Date: Nov. 19, 2009, pp. 10.

* cited by examiner

| BREACH ID 302 | APPLN/OS ID 304 | DETECTION MOD LOCATION INFO 306 | BREACH FILE HASH 308 | RESPONSE MOD LOCATION INFO 310 |

EXTENSIBLE ACTIVATION EXPLOIT SCANNER

BACKGROUND

After a legitimate copy of software is installed on a processing device, the software may be nonfunctional, or may have limited functionality until a user activates the software. Authentication components may authenticate software as being a genuine, or authorized, licensed copy of software. An activation exploit is a form of software that fools authentication components, such that counterfeit software may be authenticated as being a genuine copy of the software.

An activation exploit scanner may detect a presence of an activation exploit on a processing device in a number of different ways. For example, the activation exploit scanner may detect a presence of an activation exploit by finding a file having a particular hash value, or by other methods. Detailed detection algorithms that are specific to detecting a known activation exploit or a class of activation exploit may be called signatures.

Currently, an activation exploit scanner is bundled with signatures that may be operating-system-specific or application-specific. To scan for new activation exploits or activation exploits associated with a different operating system or application, the activation exploit scanner is rebuilt with new signatures, repackaged, and redeployed. As a result, the rebuilt activation exploit scanner is subjected to extensive and repetitive testing, in addition to functional testing, before being redeployed.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

An extensible activation exploit scanner may be provided for detecting activation exploits or classes of activation exploits. The activation exploit scanner may have a modular structure and may include an exploit data file, at least one detection module, at least one response module, and a base scanner. The exploit data file may have one or more entries, each of which may include information regarding a respective activation exploit or a respective class of activation exploit, location information regarding a detection module, and location information regarding a response module. The base scanner may read an entry of the exploit data file and may execute a detection module, based on the location information regarding the detection module included in the entry. If an activation exploit or a class of activation exploit is detected by the detection module, then the base scanner may execute a response module, based on the location information regarding the response module included in the entry.

Capabilities of the activation exploit scanner may be updated by replacing one or more detection modules, or one or more response modules, or by adding one or more new detection modules or one or more new response modules and replacing the exploit data file with a new exploit data file including one or more new entries corresponding to the added one or more new detection modules and the added one or more new response modules.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

An extensible activation exploit scanner is provided, which eliminates much, if not all, of the extensive and repetitive testing currently performed on existing rebuilt activation exploit scanners before deployment. The extensible activation exploit scanner may have a modular structure. In embodiments consistent with the subject matter of this disclosure, the extensible activation exploit scanner may have a number of components including, but not limited to, an exploit data file, one or more detection modules, one or more response modules, and a base scanner.

The exploit data file may have one or more entries, each of which may include information regarding a known activation exploit, or a class of activation exploit. For example, in some embodiments, each entry may include a breach identifier, an application or operating system identifier, location information of a detection module, location information of a response module, as well as other or different information.

A detection module may include a signature for detecting a specific known activation exploit or a specific known class of activation exploit. A response module may cause one or more actions to be performed. The base scanner may execute, or call, the detection module for determining a presence of the known activation exploit or the class of activation exploit. If the detection module indicates that a presence of the known activation exploit or the class of activation exploit is detected, then the base scanner may execute, or call, a response module to cause one or more actions to be performed in response to detecting the activation exploit or the class of activation exploit.

Exemplary Processing Device

Figure 1:
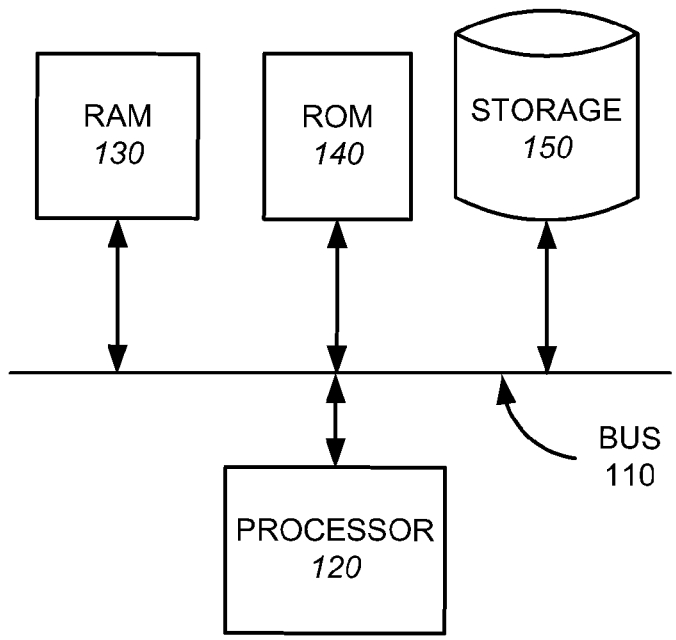
FIG. 1 is a functional block diagram of an exemplary processing device, which may be used to implement embodiments consistent with subject matter of this disclosure.

FIG. 1 is a functional block diagram of an exemplary processing device 100, which may be used to implement embodiments consistent with the subject matter of this disclosure. Processing device 100 may be a desktop personal computer (PC), a notebook or laptop PC, a server, or other processing device. Processing device 100 may include a bus 110, a processor 120, a random access memory (RAM) 130, a read only memory (ROM) 140, and a storage device 150. Bus 110 may permit communication among components of processing device 100.

Processor 120 may include at least one conventional processor or microprocessor that interprets and executes instructions. A memory may include RAM 130, ROM 140, or another type of dynamic or static storage device that stores information and instructions for execution by processor 120. RAM 130, or another type of dynamic storage device, may store instructions as well as temporary variables or other intermediate information used during execution of instructions by processor 120. ROM 140, or another type of static storage device, may store static information and instructions for processor 120. Storage device 150 may include a hard disk and corresponding drive, a flash-based storage device, or other type of data storage device or medium for storing data and/or instructions for processor 120.

Processing device 100 may perform functions in response to processor 120 executing sequences of instructions contained in a tangible machine-readable medium, such as, for example, RAM 130, ROM 140, storage device 150 or other medium. Such instructions may be read into RAM 130 from another machine-readable medium or from a separate device via a communication interface (not shown).

Modular Architecture

Figure 2:
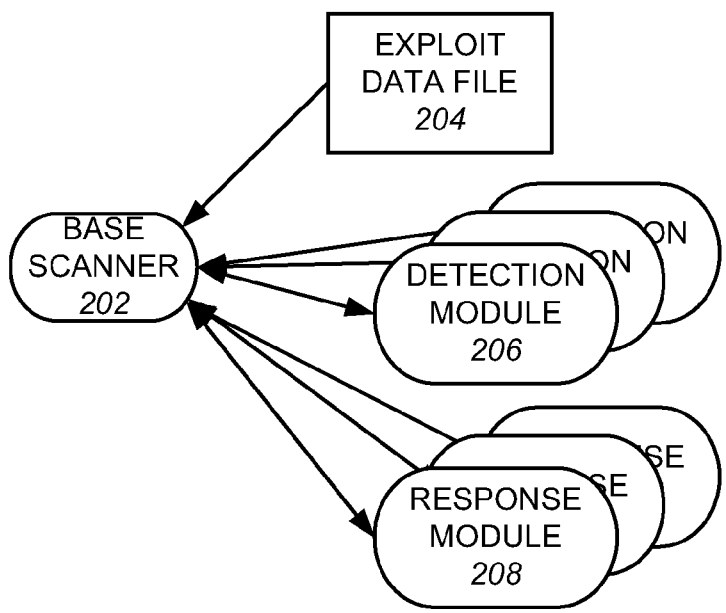
FIG. 2 is a block diagram illustrating an exemplary modular structure of an extensible activation exploit scanner consistent with subject matter of this disclosure.

FIG. 2 illustrates a modular structure of an exemplary activation exploit scanner 200 consistent with the subject matter of this disclosure. Activation exploit scanner 200 may include a base scanner 202, an exploit data file 204, one or more detection modules 206, and one or more response modules 208.

Exploit data file 204 may have one or more entries, each of which may include information about a known activation exploit or a class of activation exploit. Each detection module 206 may include a signature for detecting an activation exploit or a class of activation exploit. Each response module 208 may cause one or more actions to be performed in response to detection of a known activation exploit or a class of activation exploit.

Figures 3, 5:
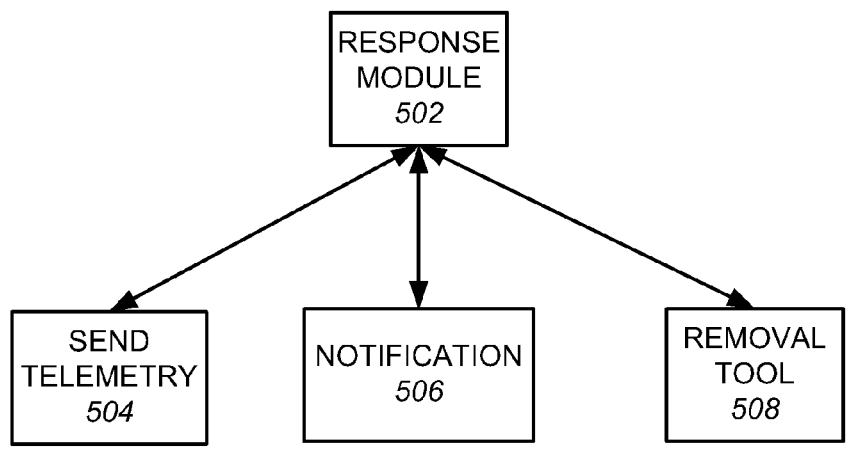
FIG. 3 illustrates an exemplary entry of an exploit data file, which may be used by various embodiments consistent with the subject matter of this disclosure.
FIG. 5 is a block diagram illustrating an exemplary response module executing, or calling, sub-modules for performing a corresponding action.

FIG. 3 illustrates an exemplary entry of an exploit data file. The entry may include a breach identifier 302, an application/operating system identifier 304, detection module location information 306, a breach file hash 308, and response module location information 310.

Breach identifier 302 may include an identifier corresponding to a particular activation exploit or a particular class of activation exploit.

Application/operating system identifier 304 may include an identifier corresponding to a particular application or a particular operating system, which may be associated with the activation exploit or the class of activation exploit corresponding to breach identifier 302.

Detection module location information 306 may include information, with respect to a current processing device, regarding a location of a detection module. For example, detection module location information 306 may be a memory address, a location on a medium, or other type of location information.

Breach file hash 308 may include a hash value of a file, an existence of which may indicate a presence of a known activation exploit or a class of activation exploit. In some cases, breach file hash 308 also may include a filename of a file, which may have a hash value matching the hash value of breach file hash 308.

Response module location information 310 may include information regarding a location, with respect to the current processing device, of a response module. For example, response module location information 310 may be a memory address, a location on a medium, or other type of location information.

Exemplary Processing

Figure 4:
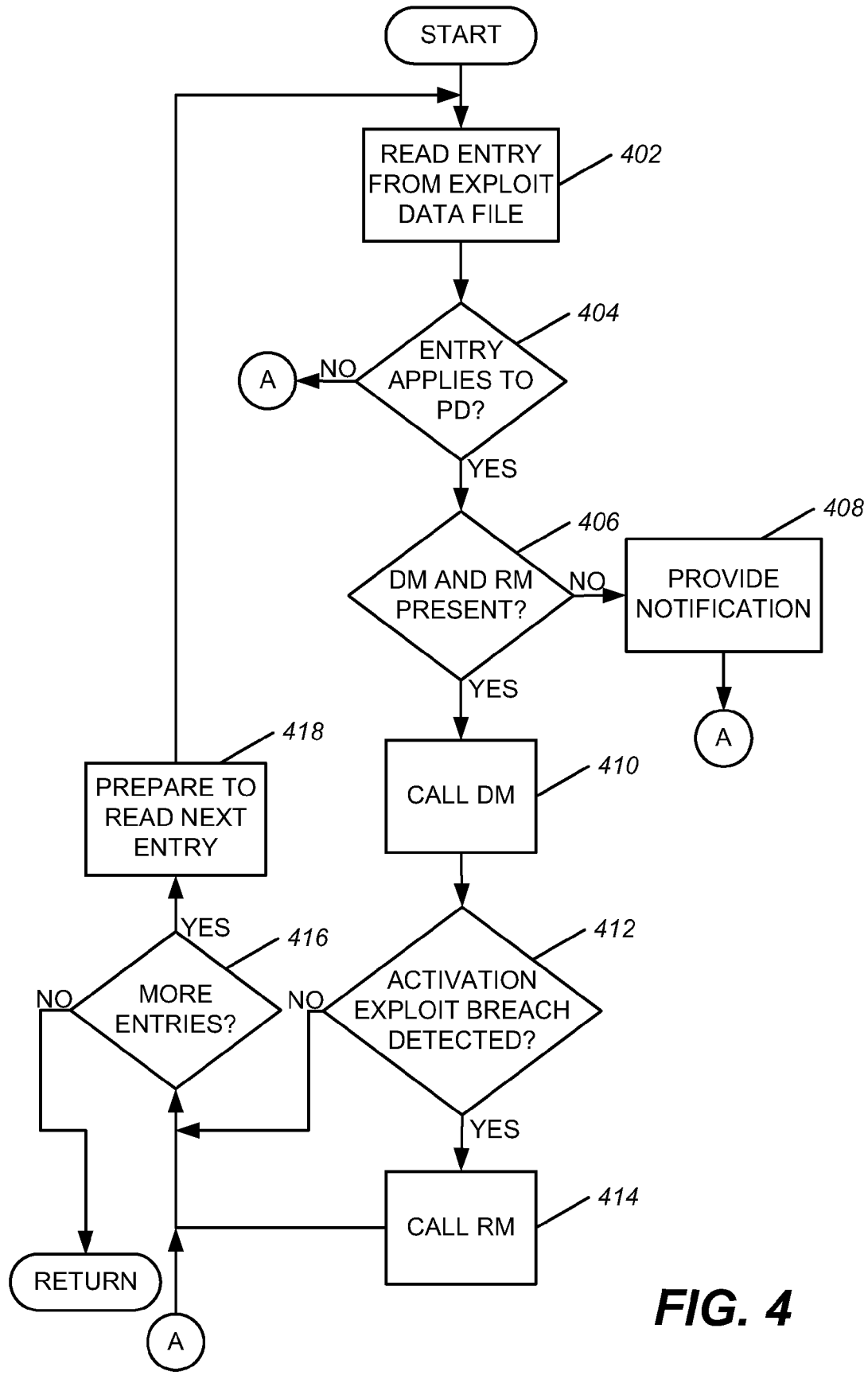
FIG. 4 is a flowchart of an exemplary process which may be performed by an extensible activation exploit scanner consistent with the subject matter of this disclosure.

FIG. 4 illustrates an exemplary process which may be performed by a base scanner of an activation exploit scanner in embodiments consistent with the subject matter of this disclosure. The process may begin with a base scanner reading an entry from an exploit data file (act 402).

Next, the base scanner may determine whether the entry applies to a processing device executing the activation exploit scanner (act 404). For example, if a processing device (PD) is executing operating system X, and the entry applies to operating system Y (as may be indicated by application/operating system identifier 304), then the entry does not apply to the processing device.

If the entry is determined not to apply to the processing device, then the base scanner may determine whether there are any additional entries of the exploit data file (act 416). If the base scanner determines that there are no additional entries of the exploit data file, then the process is completed. Otherwise, the base scanner may prepare to read a next entry of the exploit data file (act 418) and act 402 may be performed again.

If, during act 404, the base scanner determines that the entry of the exploit data file does apply to the processing device, then the base scanner may determine whether a detection module and a response module are present, with respect to the processing device, based on detection module location information 306 and response module location information 310 included in the entry of the exploit data file (act 406).

If the base scanner determines that the detection module and the response module are present, according to the entry of the exploit data file, then the base scanner may execute, or call, the detection module (act 410). The base scanner may use detection module location information 306 when executing, or calling, the detection module. In one embodiment, the detection module may use information from breach file hash 308 when attempting to detect an activation exploit or class of activation exploit.

The base scanner may then determine whether the detection module detected the known activation exploit or the class of activation exploit (act 412). If the known activation exploit or the class of activation exploit was detected by the detection module, then the base scanner may call a response module, as may be indicated by response module location information 310 of the entry of the exploit data file (act 414). Acts 416 and 418 may then be performed as previously discussed.

If, during act 406, the base scanner determines that either the detection module or the response module is not present, or both the detection module and the response module are not present, then the base scanner may provide a notification (act 408). The notification may be displayed on a display screen to a user and/or may be sent to a remote processing device, such that the remote processing device may download the absent modules.

In some embodiments, the response modules may be further modularized to execute, or call, one or more sub-modules to perform one or more actions. FIG. 5 illustrates an exemplary response module 502 executing, or calling, a send telemetry sub-module 504, a notification sub-module 506, and a removal tool sub-module 508.

Send telemetry sub-module 504 may send non-user-identifying information to a particular remote processing device. The non-user-identifying information may include data regarding a detected known activation exploit, or a detected class of activation exploit, as well as other non-user-identifying information.

Notification sub-module 506 may notify a user regarding detection of a known activation exploit or a class of activation exploit. In one embodiment, notification sub-module 506 may notify the user via a pop-up user interface.

Removal tool sub-module 508 may remove a detected known activation exploit or a detected class of activation exploit from the processing device.

The sub-modules shown in FIG. 5 are exemplary. In other embodiments, additional or different sub-modules may be called by response modules.

Figure 6:
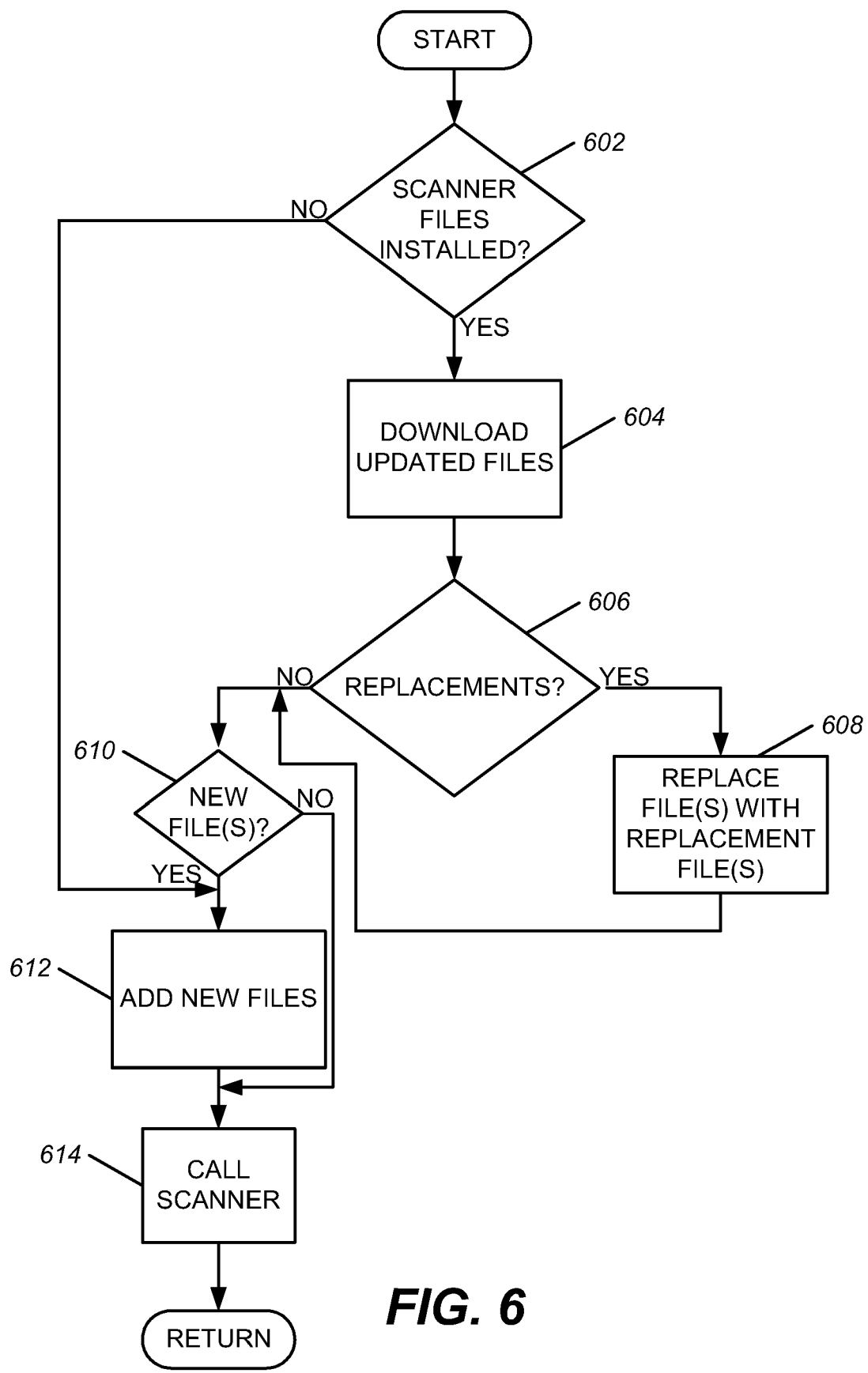
FIG. 6 is a flowchart of an exemplary process for updating capabilities of an extensible activation scanner consistent with the subject matter of this disclosure.

FIG. 6 is a flowchart illustrating exemplary processing in a processing device, with respect to updating detection capabilities and/or response capabilities of an activation exploit scanner consistent with the subject matter of this disclosure. The process may begin by determining whether scanner files are installed (act 602). The scanner files may include files pertaining to a base scanner, one or more detection modules, one or more response modules, and an exploit data file.

If the scanner files are installed, then the processing device may download updated activation exploit scanner files, if any (act 604). The processing device may determine whether any of the downloaded updated activation exploit scanner files are replacement files (act 606). In some embodiments, a replacement file may have a same filename as an installed file. If at least some of the downloaded updated activation exploit scanner files are replacement files, replacement downloaded updated activation exploit scanner files may replace at least some of the installed files (act 608). For example, a downloaded replacement detection module may replace an installed detection module, a downloaded replacement response module may replace an installed response module, and a downloaded exploit data file may replace an installed exploit data file.

The processing device may then determine whether any new files have been downloaded (act 610). In some embodiments, a new file may be a file having a filename not matching a filename of any of the installed files. If new files have been downloaded, then the new files may be added by installing the new files on the processing device (act 612). For example, if a detection capability for detecting a new activation exploit is being added, then a replacement exploit data file, including an entry having information about the new activation exploit, may be installed, as well as a new detection module and a new response module. Detection module location information and response module location information may be included in the entry of the exploit data file to indicate a location of the respective modules with respect to the processing device.

Next, a base scanner may be called, which may use the replacement exploit data file, any replaced and/or new detection modules, and any replaced and/or new response modules when scanning for one or more activation exploits or classes of activation exploits.

Embodiments of an activation exploit scanner consistent with the subject matter of this disclosure may easily be updated and quickly deployed without extensive and repetitive testing.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. For example, in other embodiments, an order of acts performed by processes, such as the processes illustrated by FIGS. 4 and 6, may be different and/or may include additional or other acts. Further, an exploit data file for other embodiments may include additional information or other information and may appear in a different order in an entry of the exploit data file.

Accordingly, the appended claims and their legal equivalents define embodiments, rather than any specific examples given.

I claim as my invention:

1. A method, performed on a processing device, for detecting an activation exploit, the method comprising:

executing, by at least one processor of the processing device, at least one detection module, each of the at least one detection module being specific for detecting a respective known activation exploit or a respective class of activation exploit, the respective known activation exploit or the respective class of activation exploit being for deceiving authentication components, such that a counterfeit copy of software is authenticated as a genuine copy of the software;

executing, by the at least one processor of the processing device, at least one response module, each of the at least one response module includes response logic for performing a corresponding action in response to detecting the respective known activation exploit or the respective class of activation exploit; and executing, by the at least one processor of the processing device, a scanner, which uses an exploit data file, the at least one detection module, and the at least one response module, the exploit data file including information regarding at least one known activation exploit.

2. The method of claim 1, wherein:

the information regarding at least one known activation exploit or class of activation exploit comprises a breach identifier corresponding to one of the at least one known activation exploit or the class of activation exploit, an identifier corresponding to an application or an operating system associated with the one of the at least one known activation exploit or the class of activation exploit, location information of a detection module of the at least one detection module, and location information of a response module of the at least one response module, and the method further comprises:

determining, by the scanner, whether the detection module and the response module are present based on the information included in the exploit data file; and when the detection module and the response module are determined to be present, the scanner performs:
scanning to detect a presence of the one of the at least one known activation exploit or the class of activation exploit by executing the detection module, and performing a corresponding action in response to detecting the presence of the one of the at least one known activation exploit or the class of activation exploits by executing the response module.

3. The method of claim 2, further comprising:
determining whether the one of the at least one known activation exploit or the class of activation exploit applies to the processing device, based on the information included in the exploit data file; and
scanning, by the scanner, to detect a presence of the one of the at least one known activation exploit or the class of activation exploit only when the one of the at least one activation exploit or the class of activation exploit is determined to apply to the processing device.

4. The method of claim 2, wherein the performing of a corresponding action further comprises:
executing, by the response module, one or more response sub-modules.

5. The method of claim 4, wherein the one or more response sub-modules perform one or more actions from a group of actions comprising sending telemetry data, providing a pop up user interface, providing a notification regarding detection of the detected one of the at least one activation exploit or the detected class of activation exploit, and removing the detected one of the at least one activation exploit or the detected class of activation exploits.

6. The method of claim 1, further comprising:
updating a capability to detect an activation exploit or class of activation exploit by replacing one or more of the at least one detection module with corresponding one or more replacement detection modules or by adding one or more new detection modules.

7. The method of claim 1, further comprising:
updating a capability to respond to a detected activation exploit or a detected class of activation exploit by replacing one or more of the at least one response module with corresponding one or more replacement response modules or by adding one or more new response modules.

8. A system for an extensible activation exploit scanner installed on a processing device, the system comprising:
at least one detection module, each of the at least one detection module including a respective signature for detecting a respective known activation exploit or a respective known class of activation exploit, the respective known activation exploit or the respective known class of activation exploit being for deceiving authentication components, such that a counterfeit copy of software is authenticated as a genuine copy of the software, the respective signature being an algorithm that is specific to detecting the respective known activation exploit or the respective known class of activation exploit;
at least one response module, each of the at least one response module for performing a corresponding action responsive to detecting the respective known activation exploit or the respective known class of activation exploit;
an exploit data file including at least one entry, each of the at least one entry including an identifier corresponding to a respective known activation exploit or a respective known class of activation exploit, location information of one of the at least one detection module, and location information of one of the at least one response module; and
a scanner for scanning for a presence of the respective known activation exploit or the respective known class of activation exploit by calling a detection module of the at least one detection module identified by an entry of the exploit file as being for detecting the respective known activation exploit or the respective known class of activation exploit, and the scanner further being for responding to the presence of the respective known activation exploit or the respective known class of activation exploit by calling a response module of the at least one response module identified by the entry of the exploit file.

9. The system of claim 8, wherein:
before scanning for the presence of the respective known activation exploit or the respective known class of activation exploit, the scanner reads the entry of the exploit file to obtain the location information of the detection module and the location information of the response module and determines whether the detection module and the response module are present, and
the scanner scans for the presence of the respective known activation exploit or the respective known class of activation exploit only when the detection module and the response module are determined to be present.

10. The system of claim 8, wherein:
each of the at least one entry of the exploit file includes an identifier corresponding to an application or an operating system associated with the respective known activation exploit or the respective known class of activation exploit.

11. The system of claim 10, wherein:
the scanner scans for the respective known activation exploit or the respective known class of activation exploit only when the respective known activation exploit or the respective known class of activation exploit applies to the processing device, based on the identifier, corresponding to an application or an operating system, included in a corresponding one of the at least one entry.

12. The system of claim 8, wherein the at least one response module executes one or more response sub-modules to perform one or more actions.

13. The system of claim 12, wherein the one or more actions include one or more actions from a group of actions comprising sending telemetry data, providing a pop-up user interface, providing a notification regarding detection of a known activation exploit or a known class of activation exploit, and removing a detected activation exploit or a detected class of activation exploit.

14. The system of claim 12, wherein the scanner is extensible by:
changing the exploit data file, and
performing at least one of:
changing a module of any of the at least one detection module,
changing a module of any of the at least one response module,
adding a new detection module, or
adding a new response module.

15. A machine-readable storage device having instructions recorded thereon for a processing device to perform a method comprising:
reading, by the processing device, an entry of an exploit data file, the entry including an identifier corresponding to a known activation exploit, location information of a detection module, and location information of a response module, the known activation exploit being for deceiving authentication components, such that a counterfeit copy of software is authenticated as a genuine copy of the software;

using, by the processing device, the location information of the detection module to execute the detection module to detect whether the known activation exploit is present; and using, by the processing device, the location information of the response module to execute the response module to perform one or more actions in response to the detection module detecting that the known activation exploit is present.

16. The machine-readable storage device of claim 15, wherein the method further comprises:

using the detection module to determine whether a file is present which, when hashed, produces a hash that matches a breach file hash included in the entry of the exploit data file.

17. The machine-readable storage device of claim 15, wherein:

the response module executes one or more sub-modules, and each of the sub-modules is for performing an action from a group of actions.

18. The machine-readable storage device of claim 17, wherein the group of actions comprise:

sending telemetry data;

informing a user about the detected known activation exploit; and removing the detected known activation exploit.

19. The machine-readable storage device of claim 15, wherein the method further comprises:

updating detection capabilities by performing one or more of:

replacing the detection module; and adding a new detection module and replacing the exploit data file with a new exploit data file, the new exploit data file including an entry having location information of the new detection module.

20. The machine-readable storage device of claim 15, wherein the method further comprises:

updating a response capability by replacing the response module.

* * * * *